(12) United States Patent
Patchett

(10) Patent No.: US 6,244,520 B1
(45) Date of Patent: Jun. 12, 2001

(54) SPRAY BOOM AND A METHOD OF SPRAYING

(76) Inventor: Raymond Lester Patchett, 713 Birchwood Ave, Blenheim (NZ)

(*) Notice: Subject to any disclaimer, the term of this patent is extended or adjusted under 35 U.S.C. 154(b) by 0 days.

(21) Appl. No.: 09/402,481

(22) PCT Filed: Apr. 9, 1998

(86) PCT No.: PCT/NZ98/00048

§ 371 Date: Jan. 12, 2000

§ 102(e) Date: Jan. 12, 2000

(87) PCT Pub. No.: WO98/46364

PCT Pub. Date: Oct. 22, 1998

(30) Foreign Application Priority Data

Apr. 14, 1997 (NZ) .................................................. 314594

(51) Int. Cl.[7] .............................. B05B 15/02; B05B 1/16; F23D 11/38
(52) U.S. Cl. .......................... 239/114; 239/123; 239/170
(58) Field of Search ........................ 239/114–118, 123, 239/171, 159, 170

(56) References Cited

U.S. PATENT DOCUMENTS

| 2,264,969 | * | 12/1941 | Frye ................................... 239/115 |
| 3,670,963 | * | 6/1972 | Stroebel et al. ...................... 239/77 |
| 4,034,915 | * | 7/1977 | Garner ............................... 239/171 |
| 4,392,613 | * | 7/1983 | Graff et al. ......................... 239/115 |
| 5,348,226 | * | 9/1994 | Heiniger et al. ..................... 239/73 |
| 5,695,132 | * | 12/1997 | Gorzka, Jr. et al. .................. 241/39 |

* cited by examiner

Primary Examiner—David A. Scherbel
Assistant Examiner—Davis Hwu
(74) Attorney, Agent, or Firm—Dickinson Wright PLLC

(57) ABSTRACT

A spray boom (1) is provided in which the spray boom (1) comprises one or more outlet nozzles (4) and one or more actuator means (9) each of which drives at least one outlet nozzle clearing means (10). The spray boom provides for the accurate dispensing of solutions or suspensions, preferably from a fixed wing aircraft for the aerial top-dressing of agricultural, horticultural and aquacultural areas.

20 Claims, 4 Drawing Sheets

SPRAY BOOM AND A METHOD OF SPRAYING

TECHNICAL FIELD

The present invention provides a spray boom, more particularly although not exclusively a spray boom suitable for spraying suspensions or solutions from a fixed wing aircraft. The present invention also provides a method of spraying suspensions or solutions from a fixed wing aircraft.

BACKGROUND ART

Conventional spray booms are well known. Spray booms are employed on fixed wing aircrafts, helicopters and ground rigs.

Conventional spray booms used on fixed wing aircraft operate on the principle of high pressure/low volume output. Essentially the suspensions or solutions to be sprayed onto pastures or ground from a conventional fixed wing spray boom are physically forced under pressure through outlets or nozzles along the spray boom. A conventional fixed wing spray boom is unable to spray thick suspensions of lime, fertilisers, seeds, biological agents or pelletized products, as it is not possible under the high pressure/low volume principle of operation to force out thick suspensions. A similar problem is encountered when a solution is particularly viscous.

Another problem associated with conventional fixed wing spray booms is that the outlets or nozzles along the spray boom have a tendency to block. Such blocking normally occurs when the pilot stops dispensing the suspension or solution from the spray boom and turns the aircraft, to make another pass of the pasture or ground. When the pilot starts respraying often the nozzles have become blocked with a residue of the suspension or solution being dispensed. It is not possible to clear the nozzles of such conventional spray booms, unless the pilot returns to ground and manually unblocks the nozzles.

The conventional spray booms employed with fixed wing aircraft operate using a sprayer having a high pressure/low volume nozzle. The flow of a solution to be dispensed can be stopped by controlling the flow of the solution to the boom. On each nozzle a pre-loaded diaphragm sensitive to pressure is employed to actuate a small valve within the nozzle itself. When the pilot cuts the flow of solution to the boom, the diaphragms and valves within the nozzles act to cause an immediate stop to the flow of liquid from the nozzles, preventing any low pressure dripping from liquid remaining in the boom and the piping from the boom to the pump. This system is unsuitable for dispensing suspensions as the mechanisms within the nozzles become clogged and the nozzle mechanisms can not be reactivated to enable the suspension to flow when the pump is applied.

Ground rig sprayers are also unable to spray thick suspension on to pasture using existing boom and nozzle design as they are subject to the same blockage factors as seen on conventional airborne spray booms. One method of overcoming this problem is to utilise large volumes of water to dilute the suspension. However, such a method is relatively expensive. Additionally, the forward speed of a ground rig sprayer does not provide a sufficient wind shear across a spray boom to atomise suspensions.

Helicopters have also been employed for spraying suspension. It has been shown that the droplet size and coverage from a helicopter is less adequate than that obtained when spraying from a conventional fixed wing aircraft. The lower airspeed of helicopters is disadvantageous when spraying, especially when using large orifice sizes to dispense product at a rate greater than 100 kg to the hectare.

In recent years, many countries have introduced legislation that provides guidelines and regulations that local bodies should adhere to in the formulation of their individual air, land and water plans. In New Zealand for example, the Resource Management Act 1991 specifies that, for fertilisers and the like, application rates above those recommended are to be classed as contaminants. Such provisions have led to a need for aerial applicators to improve their spread and accuracy of placement of materials to be applied to pasture or crops. Furthermore, conventional spraying methods for the application of dry agricultural lime do not comply with the dust emission requirements of New Zealand's Resource Management Act.

It is an object of the present invention to overcome some of the difficulties and disadvantages of conventional spraying or top dressing means, particularly for fixed wing aircraft, or to at least provide the public with a useful choice.

DISCLOSURE OF INVENTION

According to one aspect, this invention provides a spray boom, which comprises:
one or more outlet nozzles; and
one or more actuator means that are adapted to actuate one or more outlet nozzle clearing means that are positioned along the spray boom in the vicinity of the one or more outlet nozzles, in which the outlet nozzle clearing means are adapted to substantially close off the outlet nozzles when actuated into a closed position by the actuator means.

According to a further aspect, this invention provides a method of dispensing a suspension or solution from a spray boom provided with one or more outlet nozzles and one or more outlet nozzle clearing means in which the outlet nozzle clearing means are adapted to substantially close off the outlet nozzles when actuated into a closed position by the actuator means, the method including the steps of:
actuating the one or more outlet nozzle clearing means into an open position so as to clear any solution or suspension which may be blocking the one or more outlet nozzles; and
dispensing the solution or suspension through the one or more outlet nozzles.

BRIEF DESCRIPTION OF DRAWINGS

The invention will now be described by way of example with reference to the accompanying drawings in which.

BEST MODE OF CARRYING OUT THE INVENTION

Figure 1:
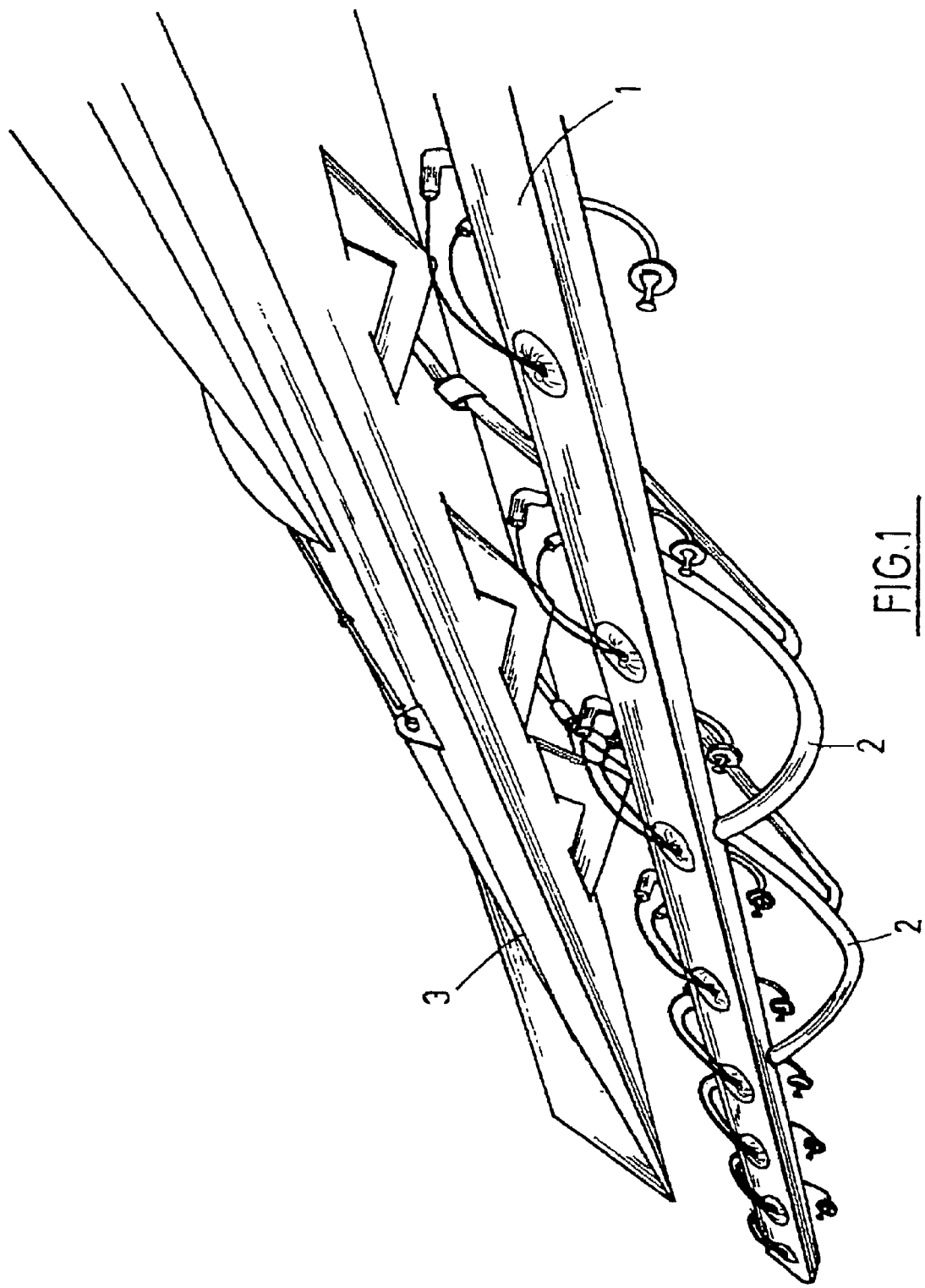
FIG. 1 shows a rear perspective view of a spray boom connected to an aircraft wing.
Figure 2:
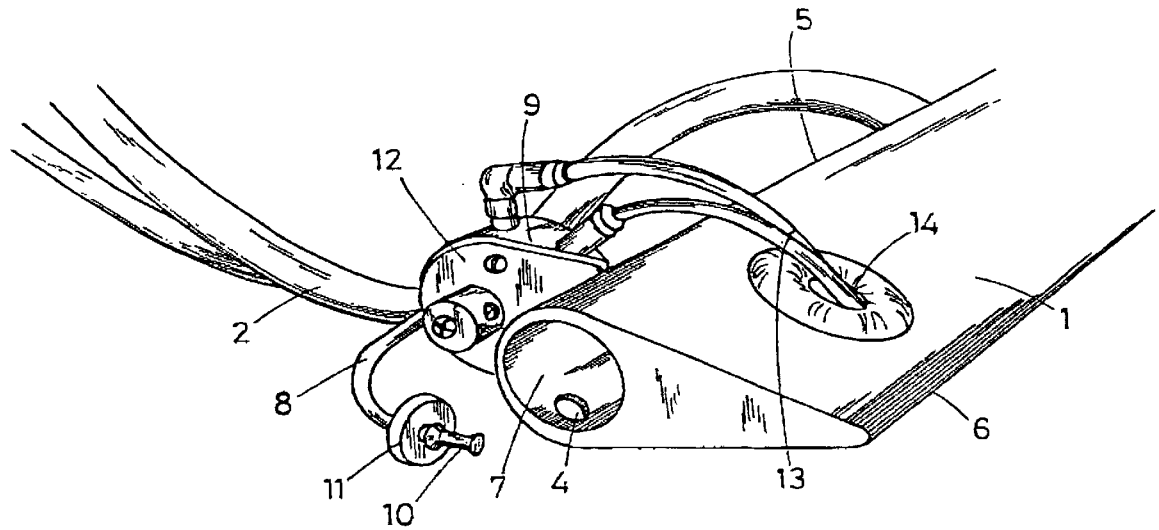
FIG. 2 shows a rear perspective view of a spray boom with an actuator means on the spray boom and an outlet nozzle clearing means in an open position.
Figure 3:
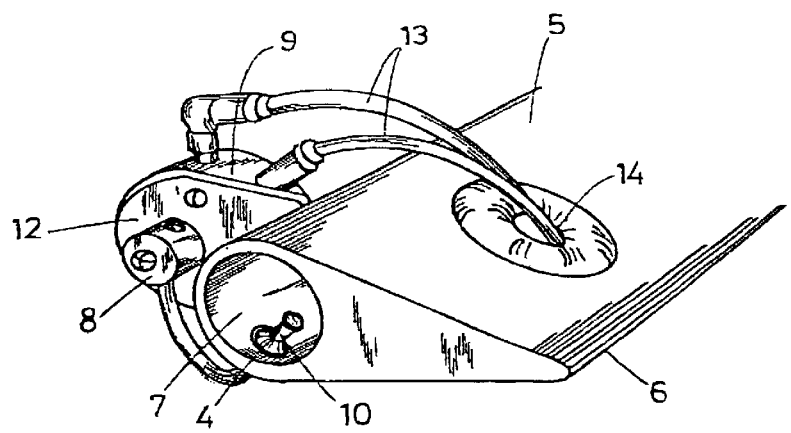
FIG. 3 shows a rear perspective view of an actuator means on the spray boom and an outlet nozzle clearing means in a closed position.
Figure 4:
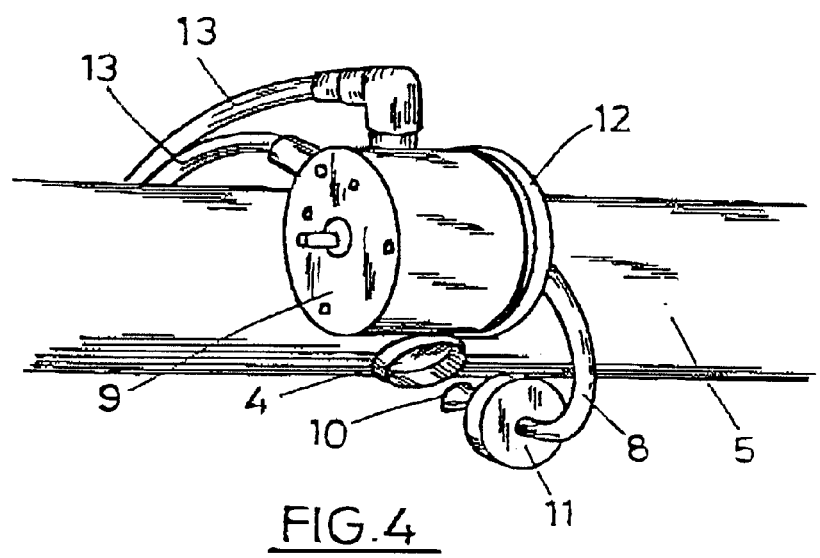
FIG. 4 shows a front perspective view of a spray boom with an actuator means on the spray boom and an outlet nozzle cleaning means in an open position.
Figure 5:
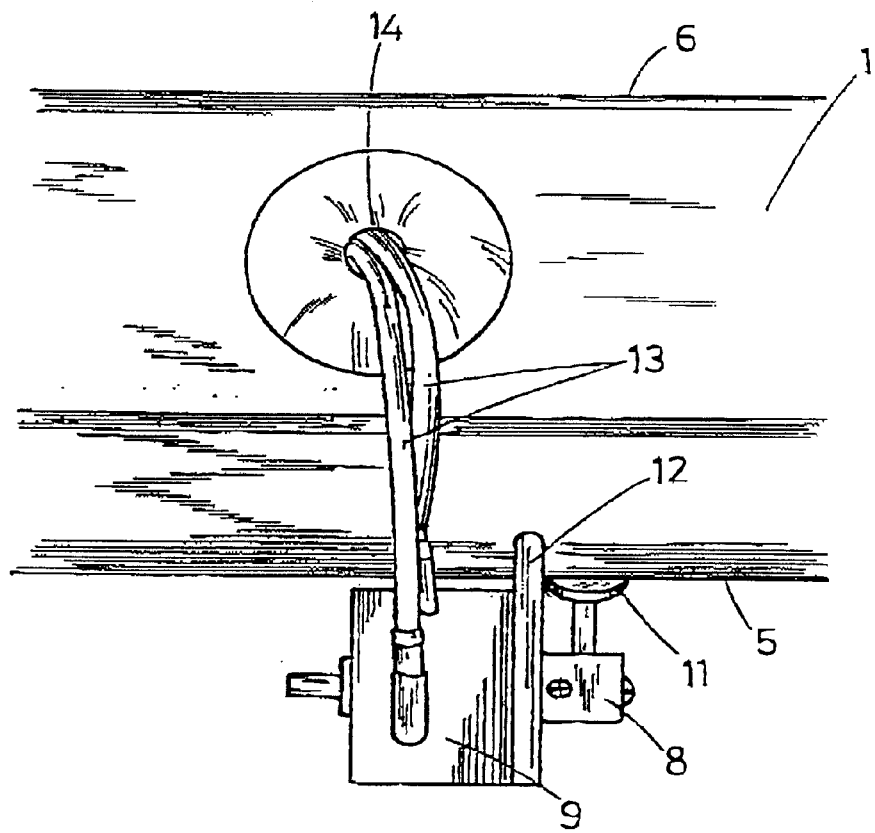
FIG. 5 shows a plan view of the topside of a spray boom and an actuator means on the spray boom, with outlet nozzle clearing means in a closed position.
Figure 6:
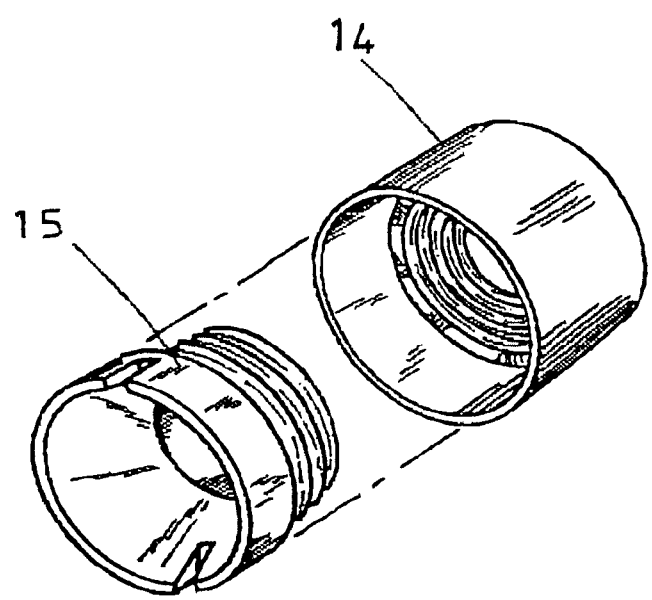
FIG. 6 shows an exploded perspective view of a nozzle adaptor which may be used with the spray boom of the invention.

As shown in the accompanying figures, a spray boom 1 is attached by connecting means 2 to a wing 3 of a fixed wing aircraft (not shown). Along the length of the spray boom are outlet nozzles 4. The outlet nozzles 4 are located near the underside of the leading edge 5 of the spray boom 1. The trailing edge 6 of the spray boom is preferably tapered, to assist in improving the aerodynamics of the boom.

An integral pipe or conduit 7 runs along the length of the spray boom 1, preferably at a trailing edge of the spray boom 1. The outlet nozzles 4 are immediately connected to the internal pipe or conduit 7. The pipe or conduit 7 is connected to a pump which is connected to a tank or hopper (not shown) on the aircraft.

Each of the outlet nozzles 4 may be optionally closed by an outlet nozzle clearing means 8. The outlet nozzle clearing means 8 comprises an arm extending to a nozzle clearing plug 10. Optionally the outlet nozzle clearing means 8 comprises a sealing means (not shown) which is adjacent to the base 11 of the nozzle clearing plug 10.

The outlet nozzle clearing means 8 and a rotary actuator 9 are connected to a plate 12. The plate 12 extends from the leading edge 5 of the spray boom 1. Connecting cables 13 carry compressed air between the rotary actuator 9 and the aircraft. The compressed air flow through the connecting cables 13 is controlled from within the aircraft by the pilot (controls and compressed air supply not shown). The controls may be electrical, mechanical, hydraulic or pneumatic. Preferably the components of the present invention are constructed from lightweight non corrosive material, for example, stainless steel, aluminum fibreglass or plastics materials.

The connecting cables are constructed preferably from a plastics tubing.

The optional sealing means adjacent to the base 11 of the nozzle clearing plug 10 is preferably but not necessarily constructed from a sponge-like material which is soft and chemical resistant, such as FAB-Foam™, silicon rubber, a plastics material, such as Teflon™, or an O-ring.

As mentioned above, the rotary actuator 9 is preferably driven by compressed air, however it is envisaged that the rotary actuator could also be hydraulically or mechanically driven.

In a further embodiment it is also envisaged that the rotary actuator 9 could be driven by electrical or solenoid means. It follows that the cables 13 would be electrical cables connecting to an electrical supply in the aircraft.

It is further envisaged that one or two actuating means could be used to drive a number of outlet nozzle clearing means. For example an embodiment is envisaged in which a shaft or connection means is driven by at least one actuating means. Along the shaft or connection means a plurality of outlet nozzle clearing means would be located at spaced apart intervals.

In a further embodiment of the invention, the outlet nozzle clearing means 8 may be fixed to the boom at any suitable point adjacent the outlet nozzles 4. In the accompanying drawings, the plate 12 and associated outlet nozzle clearing means 8 is fixed to the boom at a position above the corresponding nozzle 4. However, it is envisaged that the outlet nozzle clearing means 8 could usefully be fixed to the left or right of the corresponding nozzle 4, that is in a horizontal relationship to the nozzle.

It is also envisaged that the size of the outlet nozzles may be modified. It is envisaged that the outlet nozzle itself may be threaded to enable the securing of a further threaded nozzle piece to the boom, allowing the outlet nozzle size to be modified.

For example, it is envisaged that each outlet nozzle 4 may be provided with a nozzle adaptor 14, as shown in FIG. 6. The inside of the nozzle adaptor 14 is threaded and may be fitted with an insert 15. The insert 15 may be of any suitable size, and thus allows the size of the nozzle orifice to be adjusted, depending on the requirements of a particular spraying task.

The operation of the spray boom will now be described. Firstly, the hopper or tank of the aircraft is filled with the solution or suspension to be dispersed. Using the pump referred to above, the solution or suspension is agitated to prevent it from settling out as the aircraft is flown to the area to be sprayed (the target area). At this stage, the outlet nozzle clearing means 8 are in the closed position shown in FIG. 3.

On arrival at the target area, the pilot activates spraying. Spraying is activated by appropriate means depending on the nature of the equipment being used. The following description is given with reference to equipment which is operated using compressed air, although it will be appreciated that other means may be used.

In this form of the invention, spraying is activated by the pilot operating a spray lever (not shown). Operation of this lever shuts a valve to the hopper and opens a valve to the boom 1. This allows the suspension or solution to flow into the pipe or conduit 7 of the boom 1.

The outlet nozzle clearing means 8 are then actuated into the open position shown in FIG. 1. This operation occurs by the pilot operating a button on the spray lever, which actuates the rotary actuators 9.

With the nozzle clearing means 8 in the open position, the solution or suspension now in the pipe or conduit 7 of the boom 1 is able to be sprayed on to the target area.

When the pilot has finished making a pass over the target area, the nozzle clearing means 8 are actuated into the closed position by again pressing the button on the spray level, which actuates the rotary actuators 9. In the closed position, the nozzle clearing plugs 10 are inserted into corresponding outlet nozzle 4. The outlet nozzle clearing means 8 are held in the closed position by air pressure, and the optional sealing means of the nozzle clearing plugs 10 prevent residual solution or suspension from dribbling out of the outlet nozzles 4.

The pilot then operates the spray lever again, which shuts the valve to the boom 1 and opens the valve to the hopper or tank. This causes a drop in pressure in the boom 1. As there is not agitation of the solution or suspension in the boom 1, residual solution or suspension in the pipe or conduit 7 of the boom settles out and blocks or at least partially blocks the nozzles 4.

When the pilot returns to make another pass of the target area the outlet nozzle clearing means 8 are again actuated to the open position, in the manner described above. Upon actuation of the nozzle clearing means, the plug 10 physically rips a hole through any residue of the suspension or solution which has formed near the outlet nozzles. The shape of the plug 10 enables the removal of any residue which has now built up. It is envisaged that any suitable plug shape could be employed to remove residue buildup. If the suspension or solution which is being sprayed is particularly thick or viscous, the nozzle clearing means may be activated prior to restarting the dispensing of the suspension or solution onto the ground.

The dispensing of a suspension or solution onto the ground is ensured as the outlet nozzles 4 are cleared every time the rotary actuators 9 are activated to pivot the nozzle clearing means 10 into or out of the outlet nozzles 4.

Because of the control which the pilot has over the clearing and unblocking of the outlet nozzles along the spray boom it is possible to dispense suspensions of lime, suspensions of seed in combination with fertilizers or insecticides for example. Essentially any combination of chemicals or minerals may be sprayed in suspension or in liquid form. Seed or pelletized product may also be sprayed through the spray boom of the present invention. Biological agents, for example modified bacterial products which combat fungus may also be dispensed. Conventional systems do not successfully dispense biological agents as filtering of the biological agents, necessary to prevent the blocking of fine nozzle holes deployed on conventional boom systems, results in a high mortality rate associated with the bacteria. The high rate of mortality arises because of excessive back pressure caused by the restriction created by the filters.

A further advantage of the present invention is that it is possible to spray from an aircraft a precise area on the ground to within 1–2 meters. For example, if a pilot was approaching a road or a boundary of a property, the pilot would be able to spray to within 1–2 meters of the boundary.

It is envisaged that an aircraft incorporating the spray boom of the present invention would most preferably fly at speeds greater than approximately 80 knots to maximise atomisation of suspensions and solutions which are thick or viscous.

A spray boom of the present invention has been shown to dispense up to 1200 liters per minute of thick suspension or 2400 liters per minute of viscous solution.

When trialling the present invention, it was determined that in one pass approximately 200 kilograms per hectare of lime could be dispensed from the aircraft and spray boom. In comparison a helicopter using a conventional helicopter rig could dispense approximately 50–100 kilograms of lime per hectare, at airspeeds above 50 knots.

Economic factors have led the farming industry to target returns from fertilizer application in a shorter time period. This has resulted in the practice of applying large amounts of fertilizer for future soil reserves. However, this practice is now questionable from an environmental viewpoint, as an excess of fertilizer left on the ground as a soil reserve can be leached into waterways.

A further advantage of the present spray boom is that a finer grind of solid materials can be applied or dispensed. It has also been observed that the pastures or ground, upon which the finer grind of solid material has been dispensed, has responded more quickly than pastures or ground sprayed by conventional methods or means.

The quicker response times indicate that more nutrients are being used by the soil. It follows that as the amount of fertilizer absorbed by the ground increases, the fertilizer which remains on the ground and which is capable of being leached into waterways is considerably less than the levels observed after conventional spraying methods.

The present method of spraying shortens pasture or ground response times and thus enables a farmer to more accurately address crop and grass growth for a particular time within a farming year. The present method of spraying also allows for the inclusion of known materials or elements essential for stock health and parasite or weed eradication to be applied to the crop or ground in one application.

Generally speaking, spraying from a lower height allows for more accurate placement of material. To achieve an even swath width, the dispensing of solid fertiliser requires greater application heights than when spraying or dispensing solutions. However, the spread or evenness of the dispensed product is compromised. On the other hand the spraying of a suspension or suspended product onto the ground can be conducted at much lower heights above the target area and there is no need to compromise the evenness of the spread of the dispensed product.

A further advantage of the present invention is that it operates on the principle of high volume/low pressure output.

When in the foregoing description reference has been made to integers or components having known equivalents, then such equivalents are herein incorporated as if individually set forth.

Although the invention has been described by way of example and with reference to possible embodiments it is to be appreciated that improvements and/or modifications may be made to these embodiments without departing from the scope of the invention.

INDUSTRIAL APPLICABILITY

The present invention will find applicability in aerial top dressing, in the agricultural, aquacultural and horticultural industries and in the application of oil spill dispersants.

What is claimed is:

1. A spray boom, in which the spray boom comprises:
   at least one outlet nozzle;
   at least one outlet nozzle clearing device positioned along the spray boom in the vicinity of said at least one outlet nozzle; and
   at least one actuator adapted to actuate said at least one clearing device, wherein said at least one clearing device is adapted to substantially seal and clear said at least one outlet nozzles using said at least one actuator.

2. The spray boom of claim 1, in which a plurality of nozzles are located at spaced apart intervals along the spray boom.

3. The spray boom of claim 1, in which the actuator is located on the spray boom.

4. The spray boom of claim 3, in which the actuator is a rotary actuator.

5. The spray boom of claim 4, in which the rotary actuator is hydraulically, electrically or mechanically driven, or is driven by compressed air.

6. The spray boom of claim 1, in which the actuator is a shaft or connecting means along which is located at least one of said outlet nozzle clearing devices.

7. The spray boom of claim 6, in which the shaft or connecting means can be driven or rotated relative to the spray boom to locate the outlet nozzle clearing device into and out of the outlet nozzle.

8. The spray boom of claim 7, in which the shaft is rotated or driven relative to the spray boom, by a rotary actuator means, by mechanical means, by electrical means, or by hydraulic means.

9. The spray boom of claim 1, in which the outlet nozzle clearing device comprises an arm extending from the actuator and a nozzle clearing plug which is connected to the arm at a position remote from the actuator.

10. The spray boom of claim 9, in which the arm of the nozzle clearing device is adapted to locate the nozzle clearing plug into the outlet nozzle when the actuator is activated.

11. The spray boom of claim 10, in which the arm of the nozzle clearing device is further adapted to provide clearance between the outlet nozzle plug and the outlet nozzle when the actuator is activated to drive the arm and the outlet nozzle plug from the outlet nozzle.

12. The spray boom of claim 11, in which the nozzle clearing plug has a sealing means which seals around the outlet nozzle to prevent any leakage out of the nozzle.

13. The spray boom of claim 1, in which the actuator is controlled by a control means located inside a fixed wing aircraft, the wing of the aircraft being connected to the spray boom.

14. The spray boom of claim 13, in which the control means located in the aircraft are electrical, mechanical, hydraulic or pneumatic.

15. The spray boom of claim 1, wherein said clearing device comprises a first portion adapted to cover said outlet nozzles, and a second portion capable of being inserted into said outlet nozzles.

16. The spray boom of claim 15, wherein said first portion is a base made of a sponge-like material that can used to substantially seal said outlet nozzles, and said second portion has a narrow extended portion which can, upon being moved from a closed position to an open position, create a hole through any residue that may otherwise form in said outlet nozzles.

17. A method of dispensing a suspension or solution from a spray boom provided with one or more outlet nozzles and one or more outlet nozzle clearing device, the method comprising the steps of:

actuating said at least one outlet nozzle clearing device into an open position so as to clear any solution or suspension which may be blocking said at least one outlet nozzle; and dispensing said solution or suspension through said at least one outlet nozzle.

18. The method of claim 17, in which the spray boom is attached to the wing of a fixed wing aircraft.

19. The method of claim 17, further comprising:

positioning said at least one clearing device in a closed position before actuating said at least one clearing device to said open position, wherein said at least one clearing device can help to substantially seal said at least one outlet nozzle and wherein said movement of said clearing devices from said closed position to said open position helps to clear any residue that may otherwise from around said outlet nozzles.

20. The method of claim 19, further comprising:

using said actuator to move said clearing device back from said open position to said closed position to substantially seal said at least one outlet nozzle.

* * * * *